(12) United States Patent
Yechiel

(10) Patent No.: US 6,834,330 B2
(45) Date of Patent: Dec. 21, 2004

(54) PRE-FETCH OF RECORDS IDENTIFIED BY AN I/O TRACE

(75) Inventor: Yochai Yechiel, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 166 days.

(21) Appl. No.: 10/152,080

(22) Filed: May 21, 2002

(65) Prior Publication Data

US 2003/0221052 A1 Nov. 27, 2003

(51) Int. Cl.⁷ .............................................. G06F 12/08
(52) U.S. Cl. ...................................................... 711/137
(58) Field of Search ................................. 711/137, 111

(56) References Cited

U.S. PATENT DOCUMENTS

| | | | |
|---|---|---|---|
| 5,305,389 A | * | 4/1994 | Palmer ...................... 382/305 |
| 6,134,643 A | * | 10/2000 | Kedem et al. .............. 711/213 |
| 6,311,260 B1 | * | 10/2001 | Stone et al. ................ 711/213 |

* cited by examiner

Primary Examiner—Hiep T. Nguyen
(74) Attorney, Agent, or Firm—Fish & Richardson P.C.

(57) ABSTRACT

A pre-fetch policy is implemented by monitoring first information representative of recent accesses to a storage medium by a currently-executing application and comparing this first information with second information representative of previous accesses to the storage medium. This comparison provides a basis for determining a likelihood that the application will require access to remaining data identified by the second information.

20 Claims, 4 Drawing Sheets

PRE-FETCH OF RECORDS IDENTIFIED BY AN I/O TRACE

FIELD OF INVENTION

This invention relates to data-storage systems, and in particular, to the pre-fetching of data by such systems.

BACKGROUND

In a data storage system, data can be stored on a mass-storage device or in a semiconductor memory. Mass-storage devices, such as disks, offer considerable capacity at low cost per unit of data stored, but long access times. In contrast, semiconductor memory provides much shorter access times at higher costs per unit of data stored.

Many database applications perform queries that require retrieval of records from one or more mass-storage devices. Each retrieval of a record requires accessing the mass-storage device to copy data to a semiconductor memory. In processing such queries, it is desirable to pre-fetch records and store them in the semiconductor memory. This reduces latency because the database application can then process records already in memory while another process pre-fetches additional records.

Pre-fetching records is effective at reducing latency only to the extent that the pre-fetched records are actually sought by the database application. The success of a pre-fetch policy thus depends on the extent to which one can correctly anticipate the needs of a database application.

SUMMARY

The invention is based on the recognition that in many cases, the same or virtually the same data is periodically accessed by an application process. As a result, it is possible to identify locations of data that will soon be sought by an executing application on the basis of locations of data already retrieved that application.

One practice of the invention includes monitoring first information representative of recent accesses to the storage medium by a currently-executing application and comparing this first information with second information representative of previous accesses to the storage medium by a previous execution of the same application. This comparison provides a basis for determining a likelihood that the application will require access to remaining data identified by the second information.

An additional step of causing data identified by the second information can be added. In some aspects of the invention, all remaining data identified by the second information is pre-fetched. To reduce the possibility of unnecessary pre-fetching, other aspects of the invention provide for causing only a limited portion of the data to be pre-fetched. In some practices of the invention, the extend of this limited portion is fixed, whereas in other practices, the extent is variable and depends on the likelihood that the application will require access to data identified by that information.

Another practice of the invention includes monitoring a first sequence of locations accessed by an application and then determining, on the basis of that first that the application will require access to locations in a second sequence of locations.

The invention is also embodied by one or more articles of manufacture on which are encoded instructions for carrying out the methods described above. The articles of manufacture include one or more machine-readable media on which are encoded machine-executable instructions that, when accessed, cause a machine to carry out the foregoing methods.

Other embodiments of the invention include data-storage systems having a first storage medium for long-term storage of data and a second storage medium for temporary storage of selected data stored on the first storage medium. There is also available to the data-storage system historical data containing information representative of an application's past access to the data on the first storage medium.

Such data-storage systems include a snooping process that monitors current access by the application to data stored on the first storage medium and a matching process in communication with the snooping process for receiving therefrom information indicative of data accessed by the application. The matching process is configured to determine, on the basis of the received information, a likelihood that the process will access data identified by the historical data.

These and other features and advantages of the invention will be apparent from the following detailed description and the accompanying figures, in which:

DETAILED DESCRIPTION

Figure 1:
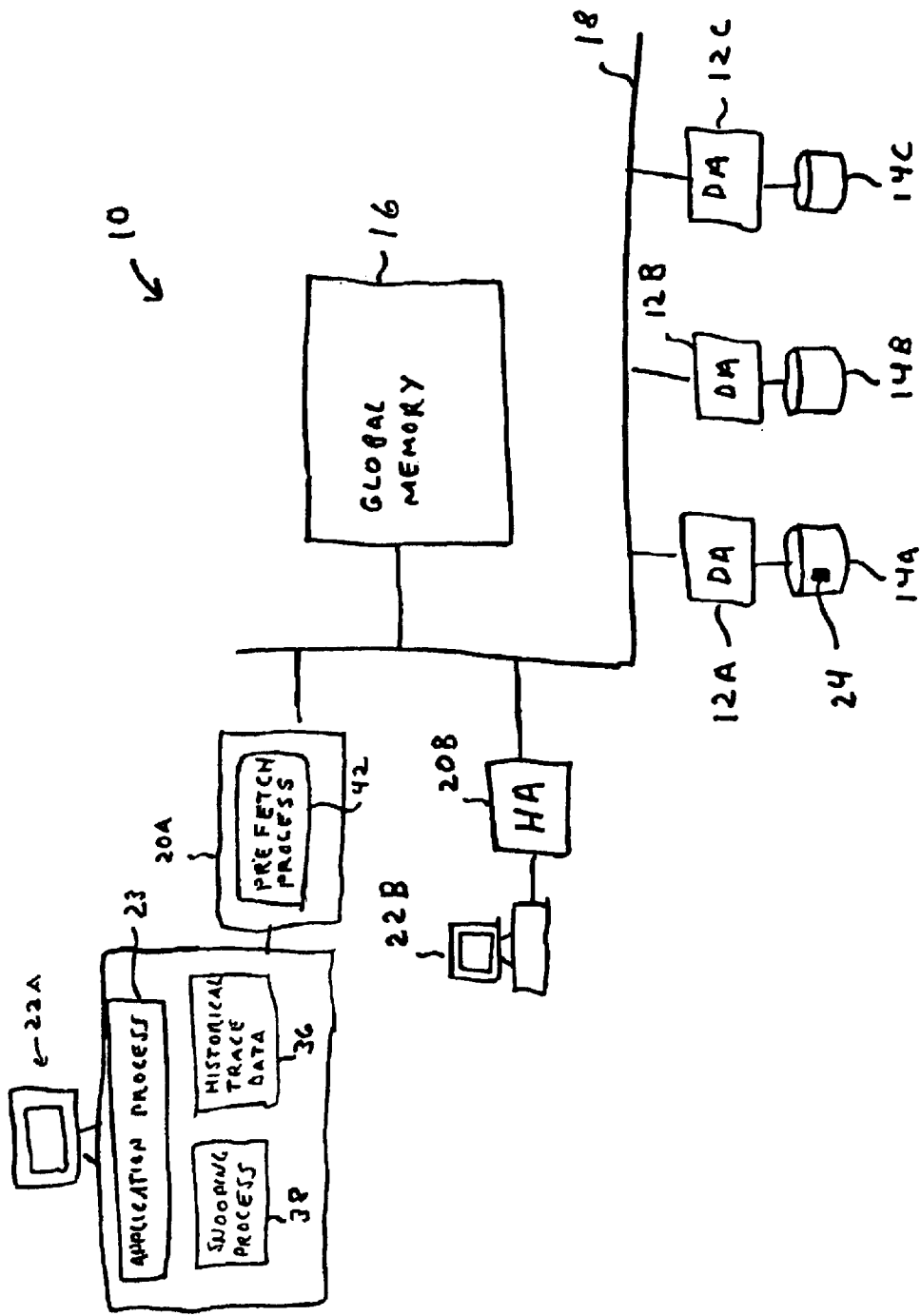
FIG. 1 is a data-storage system.

A data storage system 10, shown in FIG. 1, includes several disk adaptors 12A–C, each of which is in communication with a disk 14A–C and with a global memory 16 over a bus 18. In practice, each disk adaptor 12A–C controls several disks, however for purposes of this description, these disks can be considered as one logical disk 14A–C.

A host adaptor 20A–B, also in communication with the global memory 16, provides an interface with a host 22A–B. Executing on a host 22A is an application process 23 that periodically requires access to selected records of a database 24 stored on one or more of the disks 14A–C. In response to a request, by the application process 23, for a record, the data storage system 10 determines if a copy of that record is present in global memory 16. If so, the record is provided to the application process 23 directly from the global memory 16. Otherwise, the data storage system 10 causes the appropriate disk adaptor 12A–C to copy that record from a disk 14A–C into the global memory 16. Then, once the record is in global memory 16, the data storage system 10 provides it to the requesting application process 23.

Figure 2:
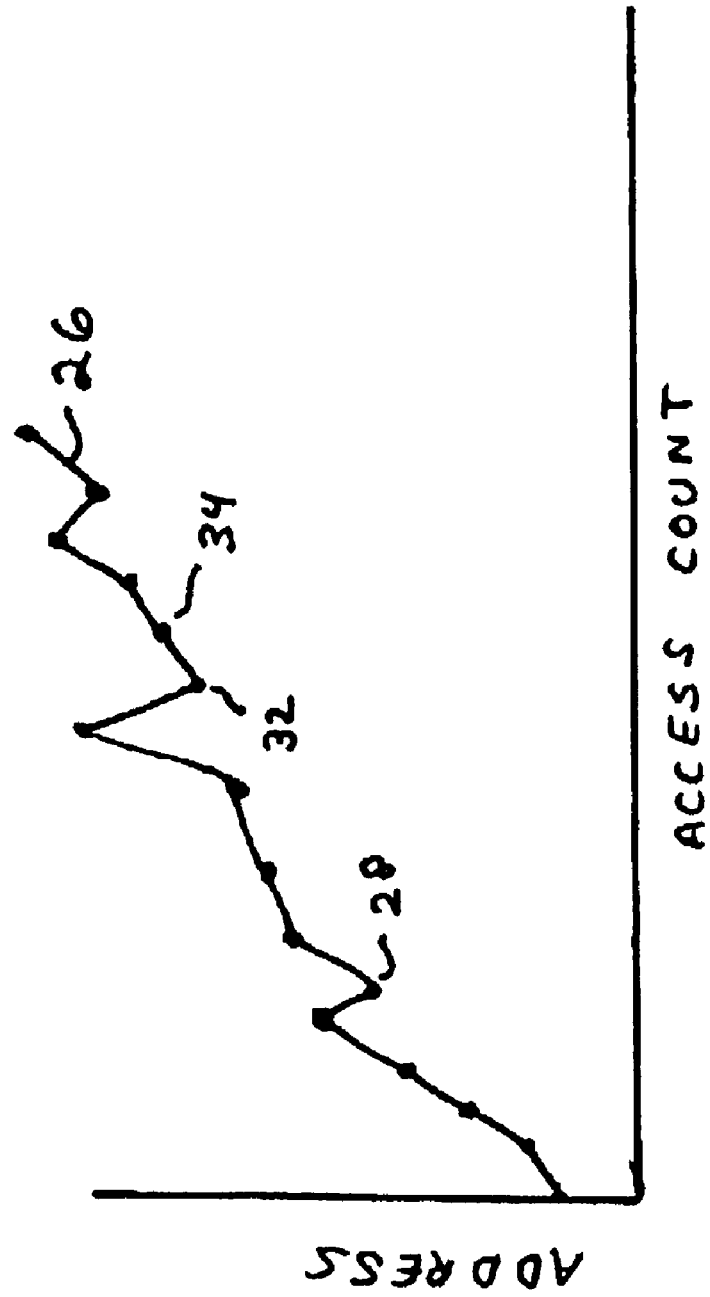
FIGS. 2 and 3 are I/O traces carried out by an application executing on the data-storage system of FIG. 1.

Each time an application process 23 makes a query, it accesses a set of records, each of which is characterized by a logical address. This sequence of logical addresses, which is shown graphically in FIG. 2, is referred to as a trace 26. The process of retrieving each data record on the trace 26 is referred to as "traversing the trace."

As described herein, the trace 26 is a sequence of logical addressees. However, this need not be the case. What is important is that the trace 26 include information indicative of the access by the application process 23 to one or more storage media during the course of a query.

The trace 26 is not restricted to defining a sequence of locations on a single disk 14A–C. Nor is the trace 26 restricted to defining locations on disks generally. During the course of a query, an application process 23 can request data distributed among several disks, memories, tapes, or other media located either at the same site or at remote sites. The trace 26 can thus be viewed as a directed path through an abstract storage space that extends across all storage locations accessible to the data storage system 10.

Figure 3:
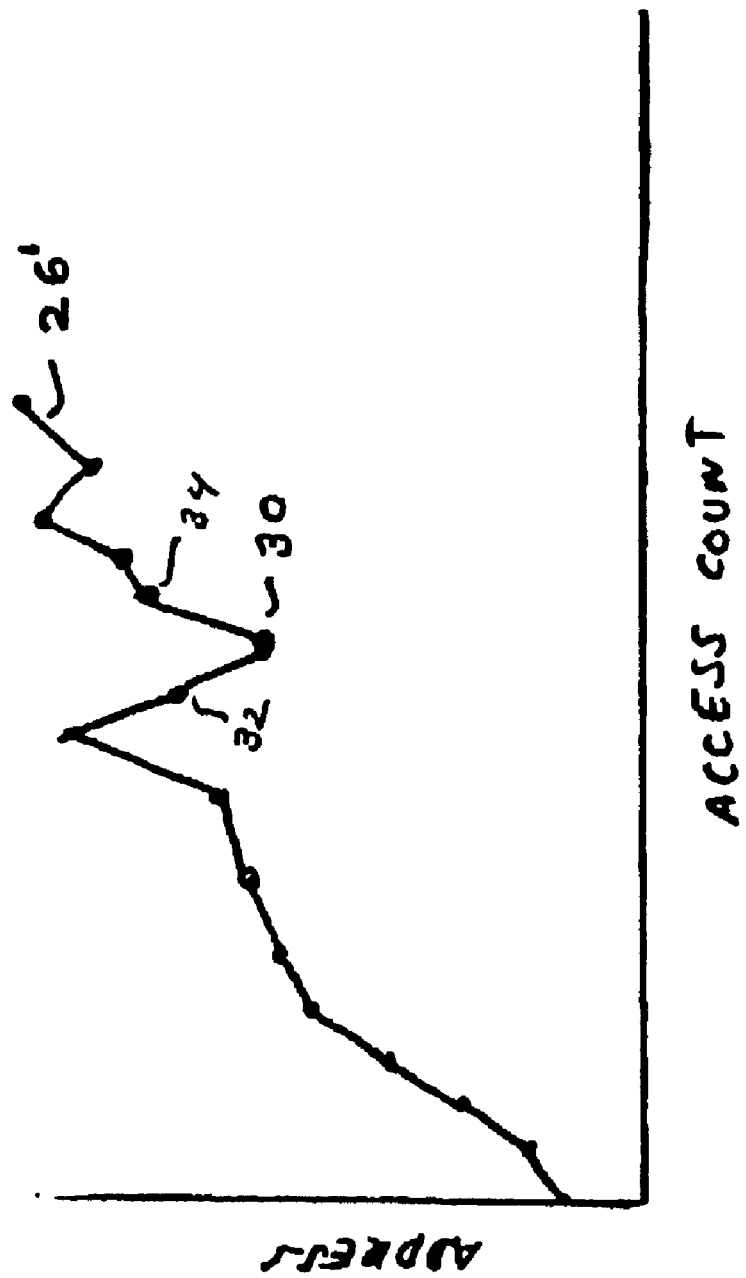

In many cases, an application process 23 periodically executes the same query on data that changes only slightly between queries. To the extent that the data changes only slightly between queries, the application process 23 will traverse substantially the same trace. For example, FIG. 3 shows a trace 26' traversed by an application process 23 executing the same query that led to traversal of the trace 26 shown in FIG. 2. Between executions of this query, the sixth record 28 has been deleted and a new record 30 has been added between the eleventh and twelfth records 32, 34. It is apparent from comparison of FIGS. 2 and 3 that the application process 23 will traverse substantially the same trace during both executions of the query.

Figure 4:
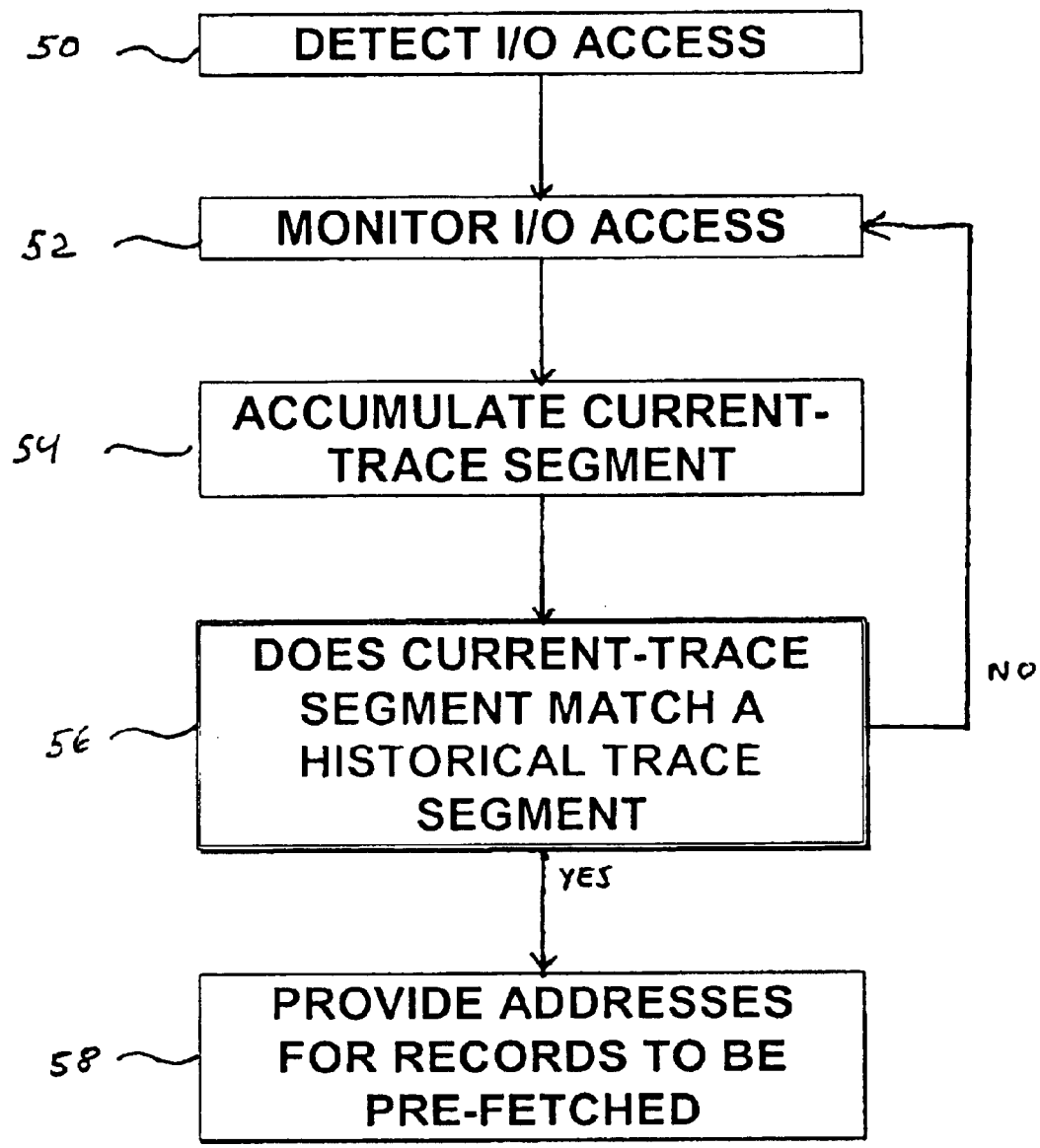
FIG. 4 is a flow-chart of a method for executing a pre-fetch policy.

FIG. 4 shows an exemplary pre-fetching policy that infers the remaining data required by an application process 23 by observing the locations of data already sought by the application process 23. To implement this pre-fetch policy, historical trace data 36 is maintained. This historical trace data 36 represents traces previously traversed by the application process 23.

In the illustrated embodiment, the historical trace data 36 is brought into the host 22 from a mass storage device so that it can be readily available for examination. However, there is no requirement that the historical trace data 36 be kept in any particular location.

Referring now to FIG. 4, in carrying out the pre-fetching policy, the host 22A executes a background snooping process 38 that constantly monitors I/O requests made by the application process 23. If the snooping process 38 detects that the application process 23 has requested retrieval of data from a disk 14A (step 50), it begins monitoring the sequence of addresses as the application process 23 retrieves that data (step 52). In this way, the snooping process 38 accumulates information indicative of a trace, referred to herein as a "current trace," presently being traversed by the application process 23. As it does so, it provides that data, which is effectively a segment of the current trace, to a matching process 40. This segment is hereafter referred to as a "current-trace segment."

Once the matching process 40 has accumulated a statistically significant current-trace segment (step 54), it attempts to determine whether the current trace is likely to be almost the same as a historical trace from the historical trace data 36. To do so, the matching process 40 searches for a historical-trace segment on a historical trace that matches the current-trace segment (step 56). In the illustrated embodiment, the matching process 40 declares a match when enough of the addresses at corresponding locations on the two segments are identical. In one practice of the invention, a match is declared when at least 80% of the addresses at corresponding locations match and at least 90% of the most recently traversed addresses match.

If no match is detected, the matching process 40 continues to monitor I/O access (step 52). However, if the matching process identifies a match, it provides, to a pre-fetch process 42, addresses of at least some of the remaining records in the historical trace (step 58). The pre-fetch process 42 then retrieves copies of those records and stores the copies in the global memory 16, where they are accessible to the application process 23. The application process 23 will thus be able to retrieve those records from the global memory 16 instead of from the disk 12A.

In some practices of the invention, the matching process 40 causes the pre-fetch process 42 to fetch all the remaining records in the historical trace. However, in some cases, the historical trace and the current trace may begin to diverge at a point beyond the extent of the current-trace segment and the historical-trace segment. If this occurs, and if the pre-fetch process 42 has retrieved records from the entire remainder of the historical trace, then a great deal of unnecessary pre-fetching will have occurred.

To reduce the risk of unnecessary pre-fetching, some practices of the invention include a matching process 40 that, upon recognizing a match, provides the pre-fetch process 42 with addresses for some, but not all, the records in the historical trace.

To a certain extent, the risk of unnecessary pre-fetches depends on the extent to which the historical trace and the current trace match. In some cases, the matching process 40 determines that there is a very good match between the historical trace and the current trace. In such cases, it is reasonable to pre-fetch many records because the likelihood of unnecessary pre-fetching is low. In other cases, the difference between the historical trace and the current trace is just barely small enough for a match to be declared. In those cases, it is reasonable to fetch fewer records.

In recognition of the foregoing, one practice of the invention calls for a matching process 40 that provides the pre-fetch process 42 with a variable number of addresses of remaining records on the historical trace. In addition, the number of addresses depends on statistics indicative of the extent of the match between the historical trace and the current trace. In one embodiment, the number of addresses provided is the smaller of five addresses and one-fifth of the length of the longest sequence of matches between the historical trace and the current trace. The number of addresses in this embodiment is capped at thirty-two. Thus, in this embodiment, the number of addresses provided to the pre-fetch policy is always between five and thirty-two.

The matching process 40 compares the historical trace and the current trace by maintaining a hash table for the historical trace. The hash table enables the matching process 40 to quickly locate an occurrence of an access to an address once that address is known. When the matching process 40 receives an address from the snooping process 38, it looks up that address in the hash table to see if that address was accessed anywhere in that historical trace. If the address is found, the matching process 40 compares a trace segment preceding that address in the current trace with the corresponding trace segment preceding the same address on the historical trace. If a selected fraction of these two trace segments match, the matching process 40 reads a selected number of addresses from the trace segment on the historical trace that immediately follows the address and provides those addresses to the pre-fetching process.

The pre-fetching of records as described above provides significant performance increases, particularly when a database 24 is striped across several disks 14A–C managed by several disk adaptors 12A–C. In such a case, the disk adaptors 12A–C can retrieve records in parallel with each other, thereby completing several pre-fetch operations in the time it takes to complete a single pre-fetch operation.

A performance advantage accrues even when the database 24 is entirely on one disk 14A. In such a case, since all logical addresses to be retrieved are provided to the disk adaptor 12A at the same time, the disk adaptor 12A can rearrange the order in which data is retrieved so as to reduce the time required to retrieve all the data. For example, if the first and last logical addresses on the list were located next to each other on the disk 14A, the disk adaptor 12A could retrieve data for those two logical addresses consecutively. Such optimization is not possible when logical addresses are provided one at a time to the disk adaptor 12A.

The foregoing description illustrates one practice of the invention in a data storage system 10 having a particular architecture. However, it is to be understood that while the invention has been described in conjunction with the detailed description thereof, the foregoing description is intended to illustrate and not limit the scope of the invention, which is defined by the scope of the appended claims. Other aspects, advantages, and modifications are likewise within the scope of the following claims.

I claim:

1. A method for pre-fetching data from a storage medium, said method comprising:

monitoring first information representative of recent accesses to said storage medium by a currently-executing application;

comparing said first information with second information representative of previous accesses to said storage medium;

determining, on the basis of said comparison, a likelihood that said application will require access to remaining data identified by said second information.

2. The method of claim 1, further comprising determining that said likelihood is in excess of a pre-fetch threshold.

3. The method of claim 2, further comprising causing data identified by said second information to be pre-fetched.

4. The method of claim 3, wherein causing data to be pre-fetched comprises causing all remaining data identified by said second information to be pre-fetched.

5. The method of claim 3, wherein causing data to be pre-fetched comprises causing a fixed portion of remaining data identified by said second portion to be pre-fetched.

6. The method of claim 3, wherein causing data to be pre-fetched comprises causing a variable portion of remaining data identified by said second portion to be pre-fetched, said variable portion having an extent that depends on said likelihood that said application will require access to said data identified by said information.

7. The method of claim 1, wherein monitoring first information comprises detecting addresses of data requested by said application.

8. The method of claim 1, wherein monitoring first information comprises obtaining a trace representative of ongoing I/O activity by said application.

9. The method of claim 1, wherein comparing said first information with said second information comprises comparing a portion of said first information with a corresponding portion of said second information.

10. The method of claim 1, wherein comparing a portion of said first information with a corresponding portion of said second information comprises determining how many recent accesses and previous accesses are common to each other.

11. A machine-readable medium having encoded thereon software for causing a computer to pre-fetch data from a storage medium, said software comprising instructions for:

monitoring first information representative of recent accesses to said storage medium by a currently-executing application;

comparing said first information with second information representative of previous accesses to said storage medium;

determining, on the basis of said comparison, a likelihood that said application will require access to remaining data identified by said second information.

12. The machine-readable medium of claim 11, wherein said software further comprises instructions for determining that said likelihood is in excess of a pre-fetch threshold.

13. The machine-readable medium of claim 12, wherein said software further comprises instructions for causing data identified by said second information to be pre-fetched.

14. The machine-readable medium of claim 13, wherein said instructions for causing data to be pre-fetched comprise instructions for causing all remaining data identified by said second information to be pre-fetched.

15. The machine-readable medium of claim 13, wherein said instructions for causing data to be pre-fetched comprise instructions for causing a fixed portion of remaining data identified by said second portion to be pre-fetched.

16. The machine-readable medium of claim 13, wherein said instructions for causing data to be pre-fetched comprise instructions for causing a variable portion of remaining data identified by said second portion to be pre-fetched, said variable portion having an extent that depends on said likelihood that said application will require access to said data identified by said information.

17. The machine-readable medium of claim 11, wherein said instructions for monitoring first information comprise instructions for detecting addresses of data requested by said application.

18. The machine-readable medium of claim 11, wherein said instructions for monitoring first information comprise instructions for obtaining a trace representative of ongoing I/O activity by said application.

19. The machine-readable medium of claim 11, wherein said instructions for comparing said first information with said second information comprise instructions for comparing a portion of said first information with a corresponding portion of said second information.

20. The machine-readable medium of claim 11, wherein said instructions for comparing a portion of said first information with a corresponding portion of said second information comprise instructions for determining how many recent accesses and previous accesses are common to each other.

* * * * *